United States Patent [19]
Yamaguchi

[11] Patent Number: 5,238,704
[45] Date of Patent: Aug. 24, 1993

[54] METHOD FOR MANUFACTURING AN ELECTRIC MOTOR

[75] Inventor: Mineo Yamaguchi, Kosai, Japan

[73] Assignee: ASMO Co. Ltd., Kosai, Japan

[21] Appl. No.: 863,965

[22] Filed: Apr. 6, 1992

Related U.S. Application Data

[63] Continuation-in-part of Ser. No. 754,373, Aug. 30, 1991.

[30] Foreign Application Priority Data

Aug. 28, 1989 [JP] Japan ............................ 1-220609

[51] Int. Cl.$^5$ .......................... B05D 1/18; B05D 1/22
[52] U.S. Cl. ..................................... 427/104; 29/597; 29/598; 118/504; 310/45; 427/282
[58] Field of Search ......................... 29/598, 596, 597; 310/45; 427/104, 282; 118/504, 503

[56] References Cited

U.S. PATENT DOCUMENTS 2,953,483  9/1960  Torok .................... 118/504 X
3,607,553  9/1971  Fritsche .................. 118/504 X Primary Examiner—Carl E. Hall
Attorney, Agent, or Firm—Burns, Doane, Swecker & Mathis

[57] ABSTRACT

A method and apparatus for coating insulating materials onto the outer surface of an armature of an electric motor whereby insulating material is inhibited from being coated on a commutator and a driving shaft associated with the armature by covering the commutator and a portion of the driving shaft with a cap and directing an air flow through a gap formed between the cap and the commutator and the driving shaft such that air is discharged near a boundary between a commutator base and the armature, thus preventing insulating material from entering the gap and coating the commutator or the portion of the driving shaft.

3 Claims, 3 Drawing Sheets

METHOD FOR MANUFACTURING AN ELECTRIC MOTOR

This application is a continuation-in-part application of U.S. patent application Ser. No. 07/754,373 filed on Aug. 30, 1991 which is pending.

BACKGROUND OF THE INVENTION

1. Field of the Invention

The present invention relates to a method for applying insulating materials onto the outer surface of an armature of an electric motor to provide an insulation cover for insulating the armature from wires to be wound around the armature.

2. Description of Related Art

In the process of manufacturing an electric motor, an armature is first assembled with a driving shaft and a commutator. Then, an insulation cover is provided onto the outer surface of the armature to insulate wires to be wound around the armature from the armature. It is well known to provide an insulation cover either by projecting a liquid paint including insulation materials onto the outer surface of an armature or by applying a resin powder of insulation materials to the outer surface of the armature and heating the resin to coat the outer surface. With either one of the conventional methods, it often happens that some of the insulating materials are distributed onto the driving shaft and commutator during the process of providing the insulation cover onto the outer surface of armature, resulting in defects in the commutator. Accordingly, with the conventional methods, it has been difficult to prevent damage to the driving shaft and commutator and ensure high quality, and electric motors comprising such impaired parts cannot always be driven as desired.

SUMMARY OF THE INVENTION

The object of the present invention is, therefore, to provide an electric motor which solves problems inherent in the conventional methods for providing an insulation cover onto the outer surface of armature.

The present invention has been developed with a view toward substantially isolating the driving shaft and commutator from the process of providing the insulation cover onto the outer surface of armature for eliminating the above described disadvantages. The essential object of the present invention is to provide an improved method of manufacturing the insulating cover by employing a cap tool for protecting the driving shaft and commutator and an air flow of proper amounts for preventing the insulating materials not only from attaching to the driving shaft and commutator, but also from escaping from the outer surface of armature during the process of providing the insulation cover, thus providing the insulation cover only onto the whole area of the outer surface of armature without distributing the insulation materials onto the driving shaft and commutator.

In order to achieve the aforementioned objects, the present invention provides a method for applying insulating materials onto the outer surface of armature of an electric motor having a commutator. The commutator includes a main body mounted on a driving shaft and a commutator base having rectified elements. The commutator base is provided between the main body and the armature having central holes for flowing an air from one side to the other side of the armature. The method comprises the following steps. Through holes are formed within the commutator base for connecting the outer surface of the commutator to the central holes of the armature. A cap is provided on the commutator to cover all the outer surfaces of the main body and commutator base while providing a gap between the inside of the cap and the main body and commutator base extending from a first opening, through which the driving shaft extends, to a second opening disposed by the juncture of the commutator base and the armature and communicating with the central holes through the through holes. Air is supplied to the first opening for discharging through the second opening and the central holes through the through holes. Insulating materials are applied onto the outer surface of the armature to provide an insulation cover of a certain thickness for insulating the armature from wires to be wound around the armature while, at the same time, discharging the air from the second opening. After stopping the application of insulating materials onto the outer surface of the armature, the air supply to the first opening is stopped. The cap is then removed from the commutator.

BRIEF DESCRIPTION OF THE DRAWINGS

These and other objects and features of the present invention will become clear from the following description taken in conjunction with the preferred embodiments thereof with references to the accompanying drawings throughout which like parts are designated by like reference numerals, and in which.

DETAILED DESCRIPTION OF THE PREFERRED EMBODIMENTS

Figure 1:
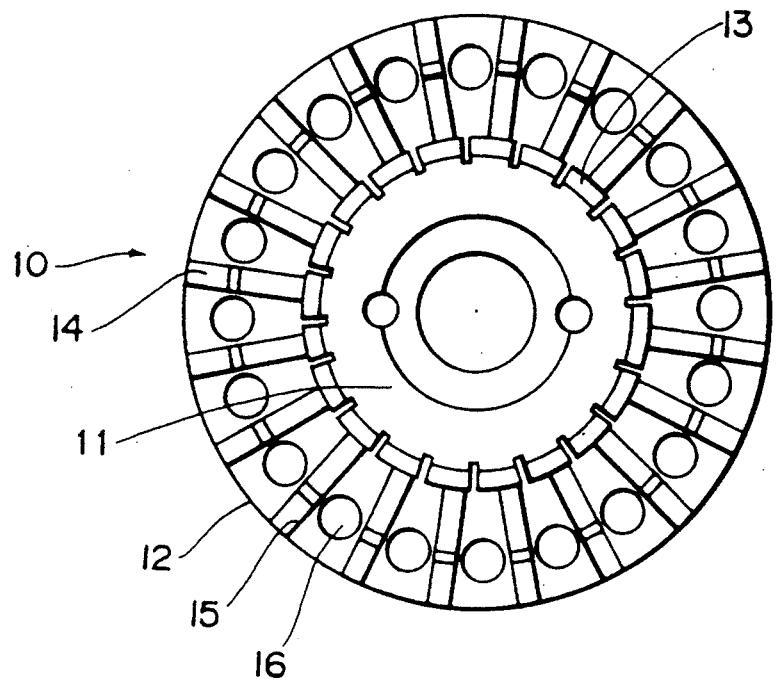
FIG. 1 is a front elevational view of a commutator for use in an electric motor according to the present invention.
Figure 2:
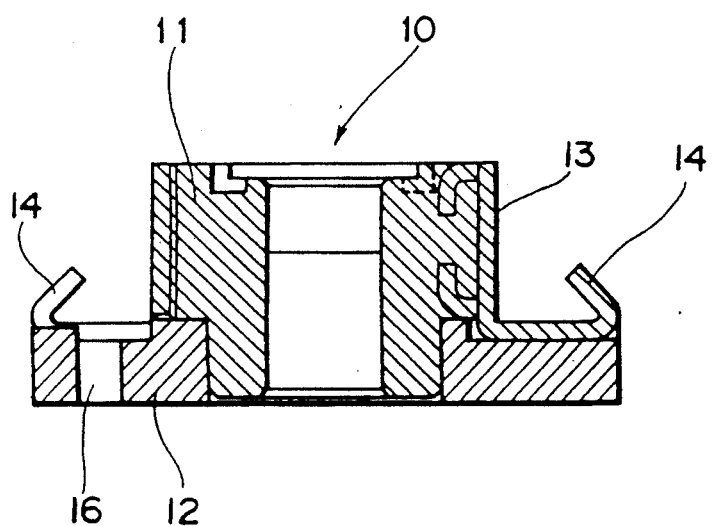
FIG. 2 is a cross-sectional view of the commutator of FIG. 1.
Figure 3:
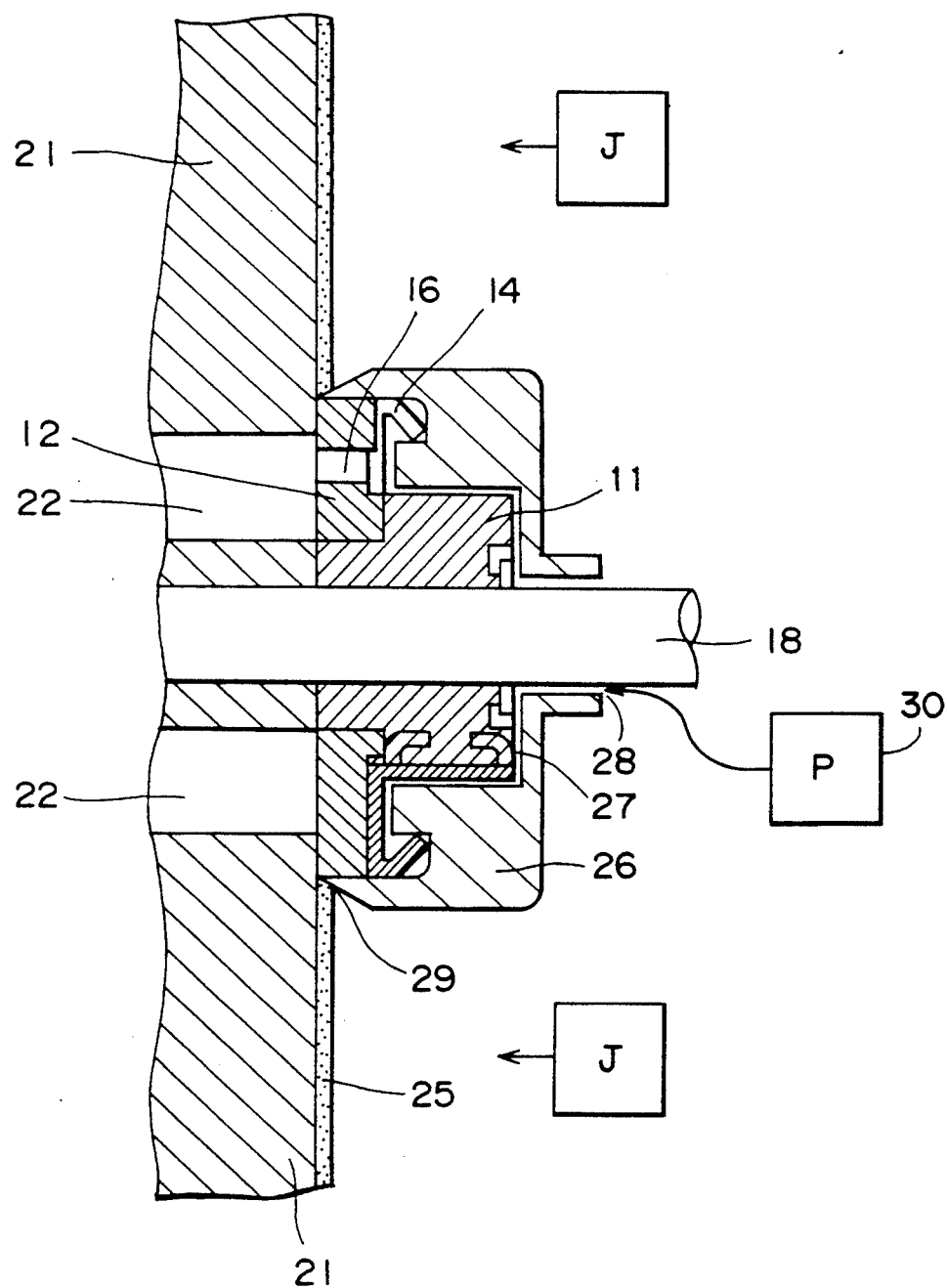
FIG. 3 is a cross-sectional view of an armature assembled with the commutator together with a driving shaft of the electric motor according to the present invention.
Figure 4:
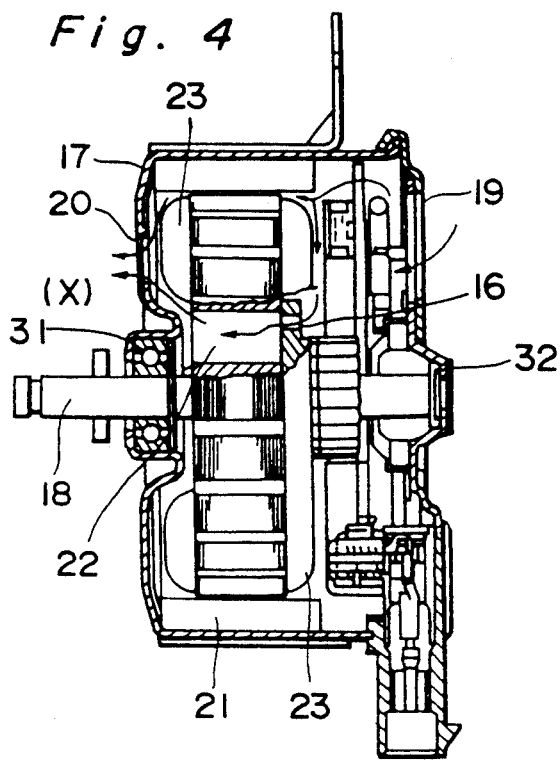
FIG. 4 is a partially cross-sectional view of the motor assembled with the armature of the present invention.

Referring first to FIGS. 1 and 2, a commutator 10 used with the present invention is comprised of a cylindrical commutator main body 11 made of non-conductive material to be mounted on a driving shaft 18, and a disk-shaped commutator base 12 fixedly mounted on the outer periphery of the main body 11 to form a kind of flange of the main body 11 at one side of the main body 11. On the outer periphery of the base 12, there are provided a plurality of radial grooves 15 which are formed at predetermined distances relative to each other. The grooves 15 receive therein hooks 14 having an L shape. Each groove 15 has, at one end, a hook 14 projecting from the base 12 and, at the other end, a rectifier element 13 fixedly mounted on the main body 11 with a gap. In the base 12, there are provided, between each two adjacent grooves 15, through holes 16. The through holes 16 are provided to pass through the base 12 from the outer periphery to an inner periphery at positions communicating with central holes 22 of an armature 21, as shown in FIG. 3, for the purpose of passing air through the through holes 16 from the outside of periphery of the base 12 to the central holes 22 of the armature 21 from which air is discharged to the outside of a housing 17 of an electric motor, as shown in FIG. 4. The through holes 16 are provided at positions disposed between the grooves 15 and close to upper portions of hooks 14, but not at lower portions so as to provide a portion for receiving a coil 23 of wires subjected to fusing on the hooks 14. The armature 1 as well as the commutator 10 are fixedly mounted on the driving shaft 18 which is supported within a pair of bearings 31, 32 of the housing 17. The housing 17 covers the armature 21 and commutator 10 and has an open hole 19 at one side and another open hole 20 at the other side of the housing so that air can be passed through from the open hole 19 to the open hole 20 through the through holes 16 of the base and the central holes 22 of the armature 21 by means of a fan (not shown) provided on the driving shaft 18 in a known manner. The fan provides a cooling effect at the center of the core of the armature 21 at the time of running the motor.

In the process of manufacturing the motor, the commutator 10 is first assembled with the main body 11 and base 12 in addition to the hooks 14. The armature 21 is mounted on the driving shaft 18 together with the commutator 10. The base 12 of the commutator 10 is fitted integrally to the outer surface of the armature 21. Insulating materials such as insulating resin are then applied onto the whole surface of the armature 21, except for the surfaces of the commutator 10 and driving shaft 18, so as to form a insulation cover 25 for insulating the cores 23 of wires to be wound around the armature 21 from the armature 21 at the next step. However, before applying the insulating materials, a cap 26, which may be made of metal is provided to cover the commutator 10. The cap 26 covers the whole surface of the main body 11 and base 12, exposing only the exterior of the inside edge of the main body 11 facing the driving shaft 18 by a first opening 28 in the cap 26 and the outside edge of the base 12 facing the armature 21 by a second opening 29 in the cap 26. Between the cap 26 and commutator 10, there is a gap 27 forming a passage for flowing air from the first opening 2 by the driving shaft 18 to the second opening 29 around the boundary line between the armature 21 and the base 12. The gap 27 also communicates with the through holes 16 for discharging some amount of air to the central holes 22 of the armature 21. By providing the cap 26 on the commutator 10, only the outer surface of the armature 21 is exposed when the insulating materials are applied thereon. An air feeder P such as an air pump is connected with the first opening 28 of the cap 26 to supply air through the gap 27 to the second opening 29 in addition to the through holes 16. The air discharging from the second opening 29 prevents any materials exterior to the gap 27, such as insulating materials, from entering into the gap 27. By discharging air from the through holes 16 to the central holes 22 a means is provided to keep air discharging from the second opening 29 at a relatively constant level, even where the output of the pump P varies. In this manner, a uniform air barrier is formed to separate the outer surface of the armature 21 from the area of the commutator 10 including the base 12 and main body 11 together with the driving shaft 18.

Upon setting up the air barrier between the armature 21 and the commutator 10, which is covered by the cap 26 together with the driving shaft 18, the insulating materials are applied onto the whole surface of the armature 21 to form an insulation cover 25 of uniform thickness for insulating the coils 23 of wires to be wound around the armature 21 from the armature 21. One technique of applying insulating materials is by projecting a liquid paint, including insulating particles, onto the outer surface of the armature 21 by a projector J. The paint dries, such as after the application of heat, to from the insulation cover 25. Another method of applying insulating materials is by dipping the armature 21 in a powder including insulating materials, such as epoxy resin, and applying heat to melt the resin to coat it onto the outer surface of armature 21 so as to form the insulation cover 25. With the above processes, the insulation cover 25 is formed only on the outer surface of the armature 21 in a uniform thickness. The insulation cover 25 ends at the boundary line between the armature 21 and the commutator 10. After providing the insulation cover 25, the air supply to the passage is stopped, and the cap 26 is removed from the commutator 10. Thereafter, the coils 23 of wires are provided around the armature 21, and the housing 17 is provided to cover the armature 21, commutator 10 and driving shaft 18 is a known manner, thereby providing an electric motor. The electric motor manufactured in the present invention is well insulated between the armature and the coils and has a commutator 21 that is not inadvertently coated with insulating material.

Figure 5:
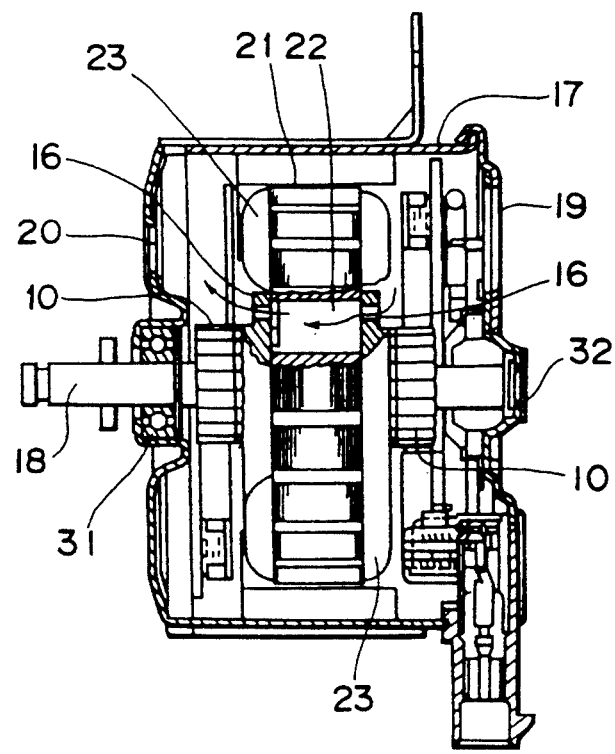
FIG. 5 is a partially cross-sectional view of an electric motor in the modification of motor of FIG. 4.

Although the present invention has been fully described in connection with the preferred embodiments thereof with reference to the accompanying drawings, it is to be noted that various changes and modifications will be apparent to those skilled in the art. For instance, as shown in FIG. 5, there are provided a pair of commutators 10, 10 on the both sides of the armature 21. Both sides of the armature 21 are coated by the insulation cover 25. Such changes and modifications are to be understood as included within the scope of the present inventions as defined by the appended claims.

What is claimed is:

1. A method for applying insulating materials onto an outer surface of an armature of an electric motor, the armature being connected to a commutator, the commutator including a main body having an outer surface and mounted on a driving shaft and a commutator base having rectified elements, the commutator base being disposed between the main body and the armature, comprising the steps of:

capping the commutator with a cap that covers the outer surface of the main body, the commutator base, and a portion of the driving shaft and forms a gap between an inside of the cap and the main body, the commutator base, and the portion of the driving shaft which are covered by the cap, the gap extending from a first opening in the cap through which the driving shaft extends to a second opening by the commutator base and the armature;

supplying air to the first opening for discharging through the second opening;

applying insulating materials to the outer surface of the armature to provide an insulation cover for insulating the armature while, at the same time discharging air from the second opening;

stopping application of insulating materials onto the outer surface of the armature;

stopping the air supply to the first opening; and removing the cap from the commutator.

2. A method for applying insulating materials onto an outer surface of an armature of an electric motor, the armature being connected to a commutator, the commutator including a main body having an outer surface and mounted on a driving shaft and a commutator base having rectified elements and through holes extending through the commutator base, the commutator base being disposed between the main body and the armature, the armature having a central hole connecting with the through holes, comprising the steps of:

capping the commutator with a cap that covers the outer surface of the main body, the commutator base, and a portion of the driving shaft and forms a gap between an inside of the cap and the main body, the commutator base, and the portion of the driving shaft which are covered by the cap, the gap extending from a first opening in the cap through which the driving shaft extends to a second opening by the commutator base and the armature and communicating with the central holes through the through holes;

supplying air to the first opening for discharging through the second opening and the central holes through the through holes;

applying insulating materials to the outer surface of the armature to provide an insulation cover for insulating the armature while, at the same time, discharging air from the second opening;

stopping application of insulating materials onto the outer surface of the armature;

stopping the air supply to the first opening; and removing the cap from the commutator.

3. A method for applying insulating materials onto an outer surface of an armature of an electric motor, the armature being connected to a commutator, the commutator including a main body having an outer surface and mounted on a driving shaft and a commutator base having rectified elements, the commutator base being disposed between the main body and the armature, the armature having a central hole, comprising the steps of:

forming through holes within the commutator base for connecting the outer surface of the commutator base to the central hole;

capping the commutator with a cap that covers the outer surface of the main body, the commutator base, and a portion of the driving shaft and forms a gap between an inside of the cap and the main body, the commutator base, and the portion of the driving shaft which are covered by the cap, the gap extending from a first opening in the cap through which the driving shaft extends to a second opening by the commutator base and the armature and communicating with the central holes through the through holes;

supplying air to the first opening for discharging through the second opening and the central holes through the through holes;

applying insulating materials to the outer surface of the armature to provide an insulation cover for insulating the armature while, at the same time, discharging air from the second opening;

stopping application of insulating materials onto the outer surface of the armature;

stopping the air supply to the first opening; and removing the cap from the commutator.

* * * * *